(12) United States Patent　　　(10) Patent No.:　　US 12,689,687 B2
Nakazawa　　　　　　　　　　　　(45) Date of Patent:　　　Jul. 21, 2026

(54) DEVICE MANAGEMENT SERVER, CONTROL METHOD FOR DEVICE MANAGEMENT SERVER, AND STORAGE MEDIUM

(71) Applicant: CANON KABUSHIKI KAISHA, Tokyo (JP)

(72) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 18/763,143

(22) Filed: Jul. 3, 2024

(65) Prior Publication Data

US 2025/0030780 A1　　　Jan. 23, 2025

(30) Foreign Application Priority Data

Jul. 18, 2023　(JP) ................................. 2023-116675

(51) Int. Cl.
　　*H04L 67/562*　　　(2022.01)
　　*H04L 67/02*　　　(2022.01)
(52) U.S. Cl.
　　CPC ............ *H04L 67/562* (2022.05); *H04L 67/02* (2013.01)
(58) Field of Classification Search
　　CPC ....... H04L 67/51; H04L 67/34; H04L 67/562; G06F 16/95
　　See application file for complete search history.

(56) References Cited

U.S. PATENT DOCUMENTS

| | | | |
|---|---|---|---|
| 2011/0296008 A1* | 12/2011 | Kamata ................... | H04L 67/51 709/224 |
| 2012/0120848 A1* | 5/2012 | Hegde ................... | H04L 69/162 370/255 |
| 2017/0123850 A1 | 5/2017 | Nakazawa ................ | G06F 9/48 |
| 2022/0050673 A1 | 2/2022 | Nakazawa ................ | G06F 8/65 |
| 2024/0080319 A1* | 3/2024 | Kazmierski ............. | H04L 41/22 |

FOREIGN PATENT DOCUMENTS

JP　　　2022-032519　　　2/2022

* cited by examiner

*Primary Examiner* — Chirag R Patel
(74) *Attorney, Agent, or Firm* — Venable LLP

(57)　　　　ABSTRACT

A device management server configured to perform communications with a device that is a management target via an agent tests communications with a web service server that has been incorporated into the device management server and that corresponds to a service that is provided by the device management server, confirms a response thereto, and stores first confirmation results; receives and stores second confirmation results from the agent in which communications with a web service server that has been incorporated into the agent and that relates to a service that is provided by the device management server have been tested and a response thereto has been confirmed; provides the first confirmation results; and provides the second confirmation results.

10 Claims, 9 Drawing Sheets

101

DEVICE MANAGEMENT SERVER

AGENT MANAGEMENT UNIT — 301

DEVICE MANAGEMENT UNIT — 302

TASK MANAGEMENT UNIT — 303

HTTP/HTTPS SERVER — 304

FIRMWARE MANAGEMENT UNIT — 305

SOAP
HTTP/HTTPS SERVER — 306

SELF-DIAGNOSIS UNIT — 307

106

AGENT

TASK EXECUTION UNIT — 310

HTTP/HTTPS SERVER — 311

CACHE CONTROL UNIT — 312

HTTP/HTTPS
REVERSE PROXY — 313

SELF-DIAGNOSIS UNIT — 314

FIG. 6

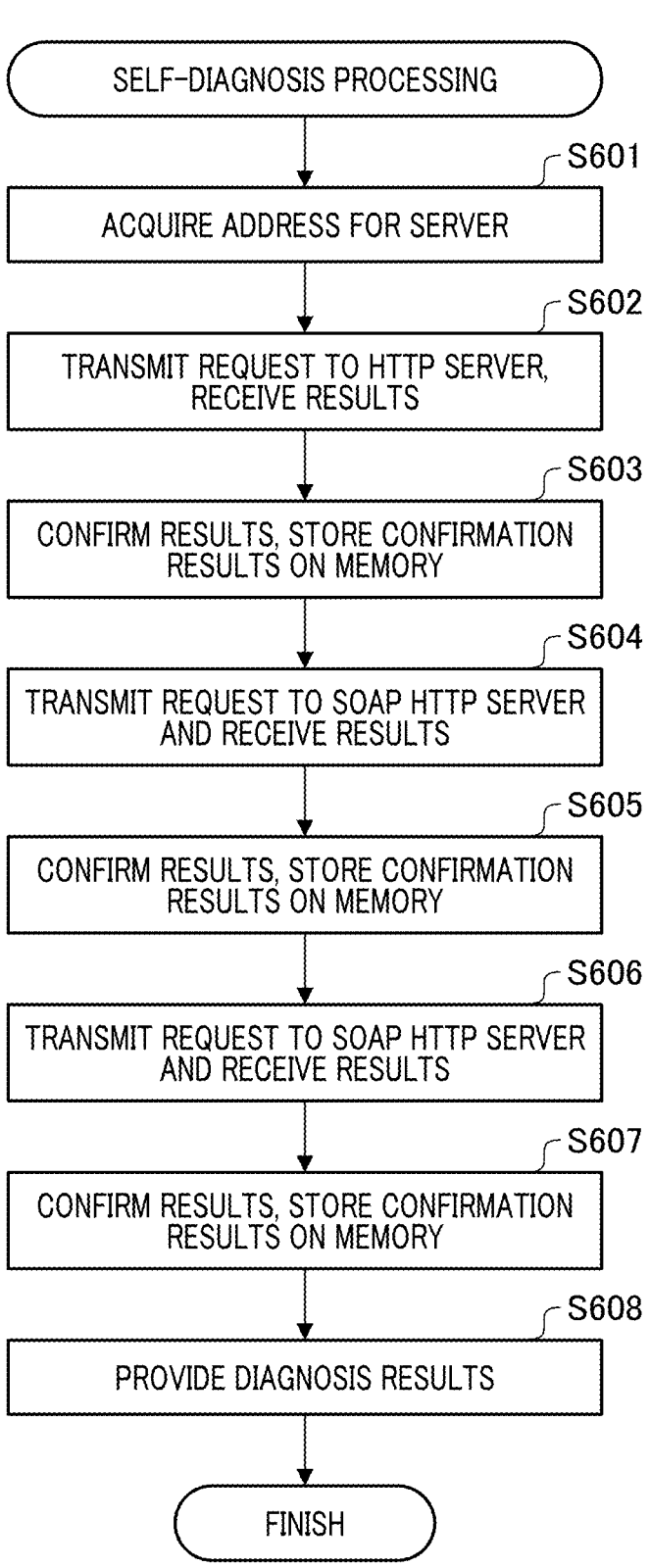

SELF-DIAGNOSIS PROCESSING

S601
ACQUIRE ADDRESS FOR SERVER

S602
TRANSMIT REQUEST TO HTTP SERVER, RECEIVE RESULTS

S603
CONFIRM RESULTS, STORE CONFIRMATION RESULTS ON MEMORY

S604
TRANSMIT REQUEST TO SOAP HTTP SERVER AND RECEIVE RESULTS

S605
CONFIRM RESULTS, STORE CONFIRMATION RESULTS ON MEMORY

S606
TRANSMIT REQUEST TO SOAP HTTP SERVER AND RECEIVE RESULTS

S607
CONFIRM RESULTS, STORE CONFIRMATION RESULTS ON MEMORY

S608
PROVIDE DIAGNOSIS RESULTS

FINISH

700

Application information

System information

Version: 4.1.4
    Database: Microsoft SQL Server 2019          ~701

Self-diagnosis results

HTTP WEB server: OK
    Firmware update server (HTTPS): OK
    Firmware update server (HTTP): Error          ~702

Agent list

| Agent name | State | Update date and time | Number of devices |
|---|---|---|---|
| Germany | Normal | 2023/5/10 | 103 ✕ |
| France | No response | 2023/5/3 | 49 ✕ |
| Spain | Normal | 2023/5/10 | 67 ✕ |
| Italy | Self-diagnosis error | 2023/5/10 | 35 ✕ |

Firm update server error
Reverse proxy (HTTP) error
Reverse proxy (HTTP) error

903

Create new agent

904

902

DEVICE MANAGEMENT SERVER, CONTROL METHOD FOR DEVICE MANAGEMENT SERVER, AND STORAGE MEDIUM

BACKGROUND OF THE INVENTION

Field of the Invention

The present invention relates to a device management server that performs communications with a network device via an agent, a control method for a device management server, and a program.

Description of the Related Art

There are device management systems that manage devices that have been connected to a network. A device management system provides various services (functions) to the devices that it manages. In a case in which a number of devices that are being managed is large, there are cases in which the device management system is configured by one management apparatus that performs total management, and a plurality of agents that execute processing on devices according to commands from the management apparatus. Japanese Unexamined Patent Application, First Publication No. 2022-32519 discloses a device management system configured by one management apparatus on which an application operates, and a plurality of agents that operate as reverse proxies, wherein the system avoids direct communication with the device management apparatus.

However, in a case in which communication is performed via an agent, when the provision of a service is not normally executed by an application of the management apparatus, it is difficult for the user to specify the reason that this is not normally executed. For example, as the reason for why the service provision cannot be executed normally, there are various causes such as other software or the like of the management apparatus on which the application operates using the port of the management device, communications with the agent being blocked by the router, or the like, and these are difficult to specify.

SUMMARY OF THE INVENTION

The present invention provides information for specifying the cause of a malfunction that occurs during the provision of a service to a network device via an agent.

The device management server of the present application is a device management server configured to perform communications with a network device that is a management target via an agent device, the device management server comprising: a memory storing instructions; and a processor executing the instructions causing the device management server to: test communications with a web service server that has been incorporated into the device management server and that corresponds to a service that is provided by the device management server, confirm a response thereto, and store first confirmation results; receive and store second confirmation results from the agent device in which communications with a web service server that has been incorporated into the agent device and that relates to a service that is provided by the device management server have been tested and a response thereto has been confirmed; provide the first confirmation results; and provide the second confirmation results.

Further features of the present invention will become apparent from the following description of exemplary embodiments with reference to the attached drawings.

BRIEF DESCRIPTION OF THE DRAWINGS

FIG. 6 is a flowchart showing self-diagnosis processing by a device management server.

FIG. 9 is a diagram showing one example of an agent management screen.

DESCRIPTION OF THE EMBODIMENTS

First Embodiment

Figure 1:
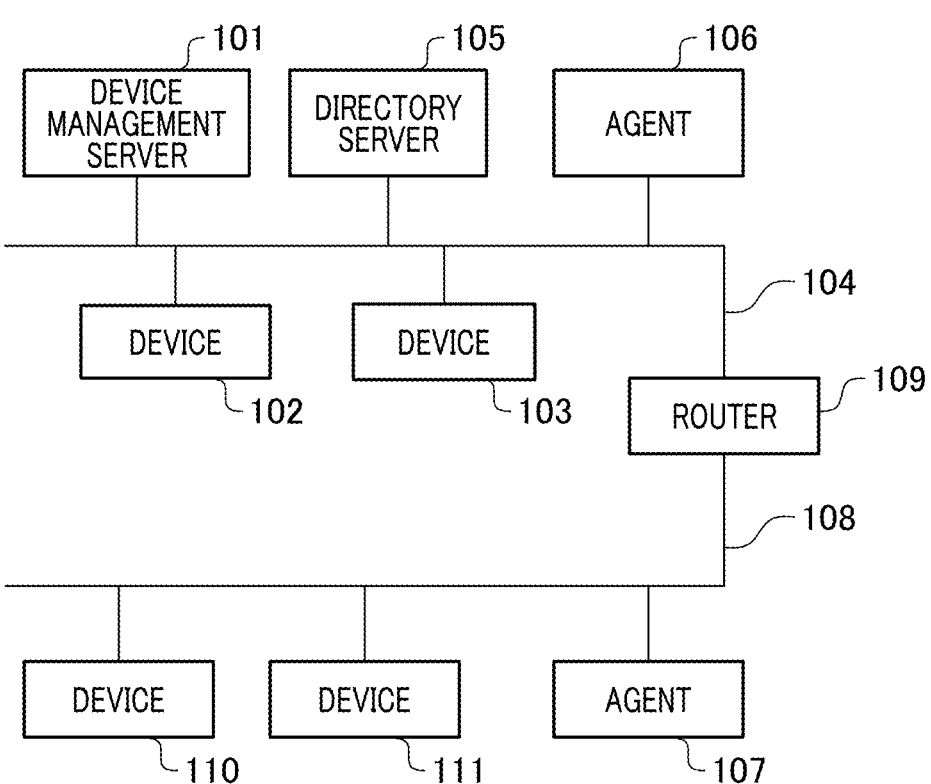
FIG. 1 is a diagram explaining a configuration of a network device management system.

FIG. 1 is a diagram explaining a configuration of a network device management system. A network device management system (referred to below as a device management system), provides services (functions) to a network device via a network. In a case in which the number of devices that are managed is large, there are cases in which the device management system is configured by a management apparatus that performs total control, and a plurality of agents that execute processing on devices according to commands from the management apparatus. The device management system of the present embodiment has one device management application server, and a plurality of agent application devices.

The device management server 101 is a server that has a device management application. An agent 106 and an agent 107 are agent devices having agent applications. That is, the device management system of the present embodiment has one device management server 101, and an agent 106 and an agent 107 as the plurality of agent application devices. The device management system manages a device 102, a device 103, a device 110, and a device 111 that serve as network devices. Note that although in the present embodiment, an example is explained in which there are two agents and four devices, even in a case in which tens of thousands of devices are managed via dozens of agents, the configurations and operations are the same as those explained in the present embodiment.

In addition, the device management system may also include a directory server 105. The directory server 105 is an information processing apparatus that manages user information such as user accounts, or the like. The device management server 101 and the directory server 105 are connected to each other by a network 104. It is also possible to perform settings on the device management server 101 such that the user of the directory server 105 can log in as the user of the device management server 101.

The device management server 101, the directory server 105, the agent 106, the device 102, and the device 103 are connected to each other via the network 104. The network 104 is, for example, a WAN. The agent 107, the device 110, and the device 111 are connected to each other by a network 108. The network 108 is, for example, a LAN. The network 104 and the network 108 are connected by a router 109. For example, the router 109 allows communications between the device management server 101 and the agent 107 on the network 109, but it is also possible to configure the router 109 so as to intercept communications between the device management server 101 and the device 110 or the device 111.

In the present embodiment, it is assumed that communications between the device management server 101 and the device 102 or the device 103 are performed via the agent 106. In addition, it is assumed that the communications between the device management server 101 and the device 110 or the device 111 are performed via the router 109 and the agent 107. Note that although in the present embodiment, an example is explained in which the device management server 101 and the agent 106 operate on different hosts, it is also possible to make the device management server 101 and the agent 106 operate on the same host. In a case in which the device management server 101 and the agent 106 are made to operate on the same host, it is possible for the device 102 and the device 103 to directly communicate with the device management server 101.

The agent 106 and the agent 107 are agent devices that perform communications with devices based on commands from the device management server 101. A web service server relating to functions that are provided by the device management server 101 is incorporated into the agent 106 and the agent 107. In addition, in the present embodiment, a reserve proxy is included in the web service server that is incorporated into the agent 106 and the agent 107. In addition, the agents are linked to network devices according to an address or the like of a network device. The agent 106 is linked to the device 102 and the device 103. The agent 107 is linked to the device 110 and the device 111.

The device management server 101 provides various services (functions) to network devices that are management targets. Note that the device management server 101 of the present embodiment provides services to a network device by using an agent. As a service that is provided by the device management server 101, there is, for example, a service for updating the firmware of a network device. In addition, the device management server 101 has a web service server relating to functions that it provides incorporated into itself. Note that in addition to one or more information processing apparatuses, the device management server 101 may also be realized by a virtual machine (cloud service) that uses resources provided by a data center comprising an information processing apparatus, or a combination thereof. In addition to one or more information processing apparatuses, the directory server 105 may also be realized by a virtual machine (cloud service) that uses resources provided by a data center comprising an information processing apparatus, or a combination thereof. In addition, the device management system can also be executed as a web-based application, and can also be used via web-browser on a PC.

The device 102, the device 103, the device 110, and the device 111 are management targets of the device management server 101, and are network devices that are able to communicate with the device management server 101. A network device is, for example, a multifunction printer (MFP) in which a plurality of functions such as a printing function, a reading function, a fax function, and the like have been put into one body. Note that the network device may also be a printer, a scanner apparatus, a 3D printer, an information processing apparatus such as a PC or the like, an image processing apparatus such as a camera or the like, a smart home electronic, or the like.

In the present embodiment, although an example is explained for a case in which the network 104 is a WAN and the network 108 is a LAN, it is sufficient if the network 104 and the network 108 are configured such that data can be sent an received, and any communication method can be used. For example, each network can be configured by any of a LAN, a WAN, a cellular network such as LTE or 5G, a wireless network, a phone line, a dedicated digital line, or the like, or a combination thereof.

In this context, the flow for the processing in which the provision of services to a network device is executed by the network device processing system will be explained using the agent 106 and the device 102 as examples. The device management server 101 sends a command to the agent 106 to operate the device 102. The agent 106 performs operations such as transmitting requests, or the like to the device 102 in accordance with the command from the device management server 101, and transmits the results to the device management server 101. As examples of operations to the device 102 of the agent 106, there is the acquisition of information from the device 102, changing the setting values of the device 102, commands to install applications on the device 102, commands to update the firmware of the device 102, or the like. In this manner, communications are performed between the device management server 101 and the agent 106, and between the agent 106 and the device 102. Therefore, the device 102 and the device management server 101 do not directly communicate.

Figure 2:
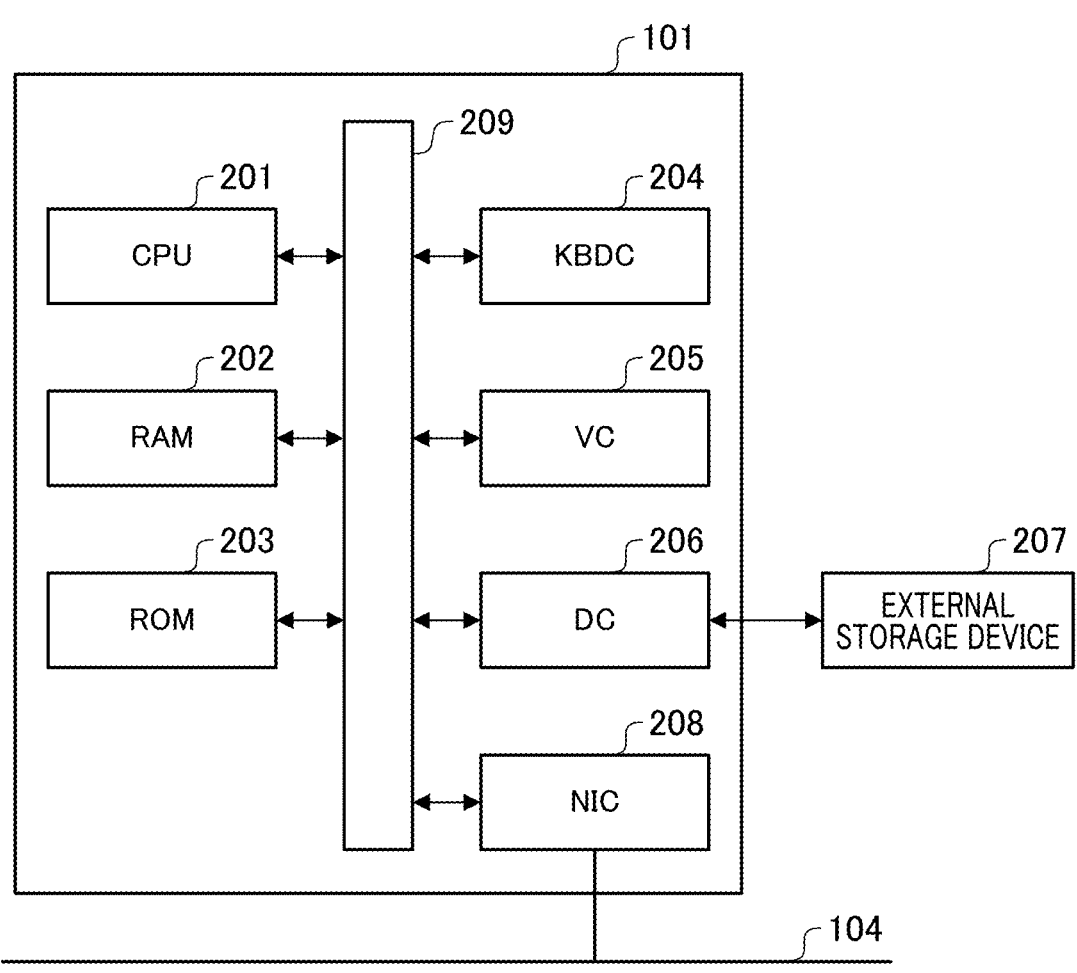
FIG. 2 is a diagram explaining a hardware configuration of a device management server.

FIG. 2 is a diagram explaining a hardware configuration of a device management server. In addition, the host computer on which the agent 106, the agent 107, and the directory server 105 operate has the same hardware configuration as the device management server 101. The device management server 101 is provided with a CPU 201, a RAM 202, a ROM 203, a KBDC 204, a VC 205, a DC 206, and a NIC 208. These configurational elements are connected to a system bus 209.

The CPU 201 controls the entirety of the device management server 101. The CPU 201 loads and executes a program that has been stored on a memory (a ROM 203 or an external storage device 207) on the RAM 202 according to necessity, and integrally controls each unit that has been connected to the system bus 209. In addition, the CPU 201 may also integrally control each unit that has been connected to the system bus 209 by loading and executing software (a program) that has been downloaded via a network on the RAM 202 according to necessity. The RAM 202 (Random Access Memory) is a data readable/writable memory, and functions as a main memory or work area, or the like of the CPU 201. The ROM (Read Only Memory) 203 is a data read-only memory, and for example, stores the basic control program for the device management server 101, and the like. The external storage device 207 is a memory such as a hard disk (HD), a solid state drive (SSD), or the like. The external storage device 207 stores each type of application including a boot program, an operating system (OS), a verification server, a verification client or the like, data base data, user files, and the like.

The KBDC 204 controls the input to the device management server 101. The KBDC 204 sends input information to the CPU 201 from an input apparatus such as a keyboard, a pointing device, or the like, which is not shown, a virtual keyboard, audio input, or the like, and controls the input to the device management server 101. The VC 205 is a video controller, and controls the display to a display apparatus, which is not shown. The display apparatus may be, for example, an LCD (Liquid Crystal Display), or it may also be a head mount display that is able to display VR (virtual reality), or the like. The DC 206 is a disk controller, and controls access to the external storage device 207. The NIC 208 is a communications controller, and the device management server 101 connects to the network 104 via the NIC 208. The CPU 201 connects to the network 104 via the NIC 108, and makes data communications possible with each device on the network.

Figure 3A:
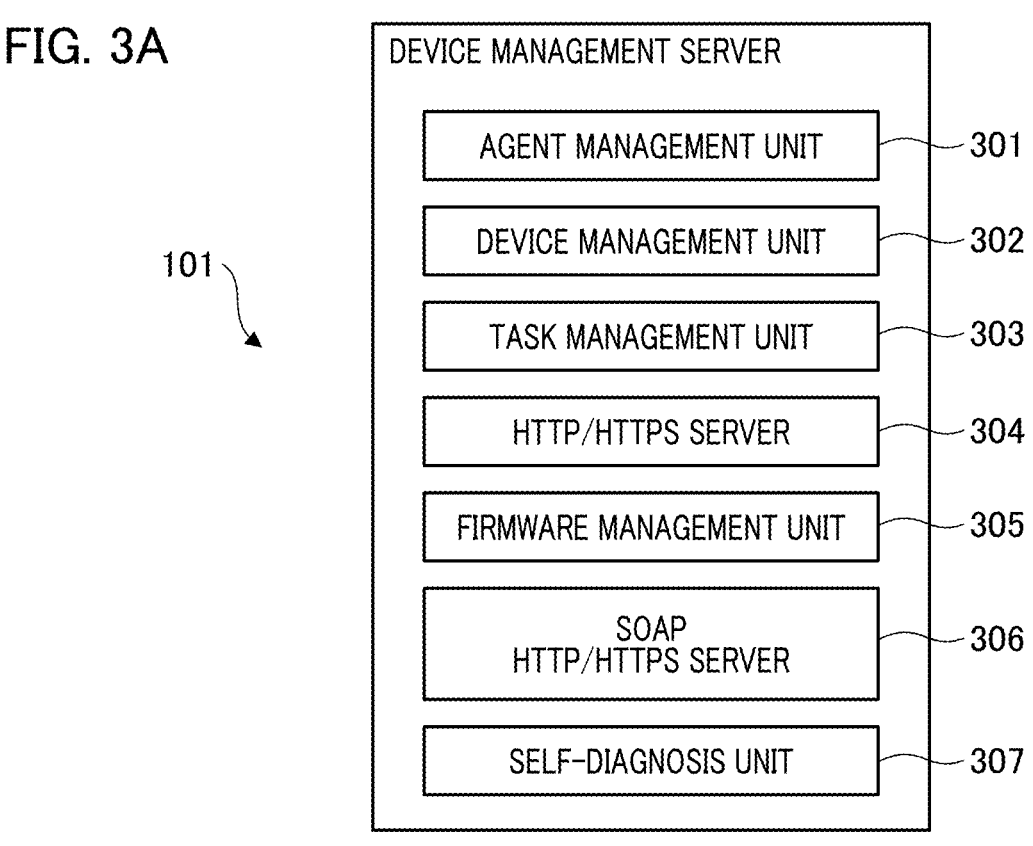
FIG. 3A and FIG. 3B are diagrams explaining software configurations of a device management server and an agent.
Figure 3B:
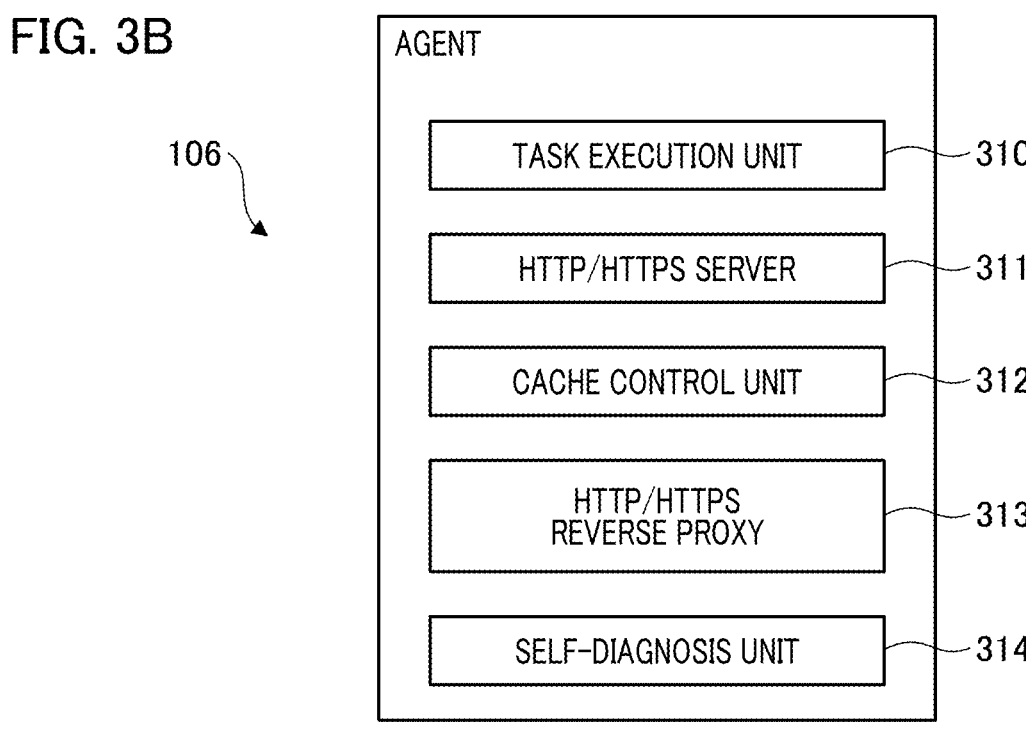

FIG. 3A and FIG. 3B are diagrams explaining software configurations of the device management server and an agent. FIG. 3A is a diagram explaining a software configuration of the device management server 101. The device management server 101 realizes the processing according to the functional model shown in FIG. 3A by the CPU 201 calling an application program for device management from a memory and executing it. The functional module that is shown in FIG. 3A is provided as, for example, a device management application.

The device management server 101 has an agent management unit 301, a device management unit 302, a task management unit 303, an HTTP/HTTPS server 304, a firmware management unit 305, a SOAP HTTTP/HTTPS server 306, and a self-diagnosis unit 307. The agent management unit 301 manages information relating to the agent 106 and the agent 107. The device management unit 302 manages information relating to the device 102, the device 103, the device 110, and the device 111. Information relating to a device includes information about to which agent the device is linked. The task management unit 303 performs the management of tasks, As the management of tasks, the task management unit 303 manages the contents and results of operations to devices. In addition, the task management unit 303 commands operations to a device from an agent by executing a task. The management information that is managed by the task management unit 303 is stored in a database that is not shown.

The HTTP/HTTPS server 304 and the SOAP HTTP/HTTPS server 306 are web service servers that are incorporated into the device management server 101, and that are related to services that are provided by the device management server 101. The HTTP/HTTPS server 304 receives requests from external apparatuses such as an agent, a device, or the like, and returns responses to the requests. In addition, the HTTP/HTTPS server 304 provides the device management server 101 with a WEB UI for a user to operate. The firmware management unit 305 performs management of device firmware. The SOAP HTTP/HTTPS server 306 receives SOAP messages for firmware update requests from a device, calls for processing in the firmware management unit 305, and returns the results to the request source. The self-diagnosis unit 307 confirms if the HTTP/HTTPS server 304, and the SOAP HTTP/HTTPS server 306 are operating normally. The device management server 101 has both an HTTP function and an HTTPS function. For example, the HTTP function is used in order to acquire data for updating the firmware from the device 102. In contrast, the HTTPS function, for which the confidentiality is high, is predominantly used for the provision of UIs, communication with the agent 106, and the like. In addition, in the present embodiment, although the HTTP/HTTPS server 304 and the SOAP HTTP/HTTPS server 306 are configured as separate elements, these functions may also be provided as a single HTTP/HTTPS server.

The firmware management unit 305 manages device firmware information. In this context, the flow of the processing in order for the device 102 and the device management server 101 to update the firmware for the device 102 will be explained. The device 102 transmits its own device information and firmware version information to the firmware management unit 305 via the SOAP HTTP/HTTPS server 306, and calls a function of the firmware management unit 305. The device information is information for uniquely identifying the device 102, and for example, is a serial number that is assigned to each device, or the like. The firmware management unit 305 specifies the address (URI) for the HTTP/HTTPS server 304 in order to acquire the firmware data necessary to update the firmware from the device information and the version information that has been received from the device 102. In addition, the firmware management unit 305 transmits the address (URI) for the HTPP/HTTPS server 304 for acquiring the firmware data to the device 102, which is the request source, via the SOAP HTTP/HTTPS server 306. The device 102 transmits an HTTP GET request to the address (URI) for the HTTP/HTTPS server 304 that has been acquired from the firmware management unit 305. The HTTP/HTTPS server 304 transmits the data that is necessary to update the firmware to the device 102. In addition, the device 102, which has received the data that is necessary to update the firmware from the HTTP/HTTPS server 304, performs a firmware update.

FIG. 3B is a diagram explaining a software configuration of an agent. In this context, although the agent 106 is explained as an example, other agents also have the same configuration. The agent 106 realizes the processing of the functional model that is shown in FIG. 3B by the CPU 201 calling an application program for use in a device management agent from a memory and executing it. The functional model that is shown in FIG. 3B is a functional model relating to a service that is provided by the device management server 101, and, for example, is provided as an agent application that is provided from the device management server 101.

The agent 106 has a task execution unit 310, an HTTP/HTTPS server 311, a cache control unit 312, an HTTP/HTTPS reverse proxy 313, and a self-diagnosis unit 314. The task execution unit 310 executes tasks that have been commanded from the device management server 101. The task execution unit 310 executes operations on a device according to a command from the device management server 101, and after transmits the results thereof to the device management server 101.

The HTTP/HTTPS server 311 and the HTTP/HTTPS reverse proxy 313 are web service servers that are incorporated into the agent 106 and that relate to services that are provided by the device management server 101. The HTTP/HTTPS server 311 receives requests from an external apparatus such as the device management server 101, a device, or the like. The device management server 101 and the agent 106 perform communications with each other by using predominantly HTTPS via the HTTP/HTTPS server 304 of the device management server 101, and the HTTP/HTTPS server 311 of the agent 106. The cache control unit 312 provides a cache function for contents within the device management server 101.

The HTTP/HTTPS reverse proxy 313 forwards the HTTP requests that it has received from a device to the SOAP HTTP/HTTPS server 306 of the device management 101. In addition, the HTTP/HTTPS reverse proxy 313 returns responses from the SOAP HTTP/HTTPS server 306 of the device management server 101 to the transmission source of the HTTP request. In this context, an HTTP request is POST, and is an XML message in which the HTTP text is SOAP. In addition, static contents such as data for updating firmware or the like that have been transmitted via the HTTP/HTTPS reverse proxy 313 can be stored on the agent 106 for a fixed period to serve as a cash. Therefore, in a case in which data for the same firmware update has been requested by a different device, the temporarily stored cache is transmitted to the device from the agent 106, and it is possible to update the firmware more quickly. In addition, by using the cache, the communications between the device management server 101 and the agent 106 are reduced, and the load for the device management server 101 is reduced.

The self-diagnosis unit 307 confirms if the HTTP/HTTPS server 311 and the HTTP/HTTPS reverse proxy 313 are operating normally. In this context, in a case in which the agent 106 is operating on the same host as the device management server 101, the agent 106 does not start up the HTTP server function of the HTTP/HTTPS server 311, or the HTTP/HTTPS reverse proxy 313. Only the HTTPS server function of the HTTP/HTTPS server 311 will be active, and this HTTPS server function receives requests from the device management server 101.

Figure 4:
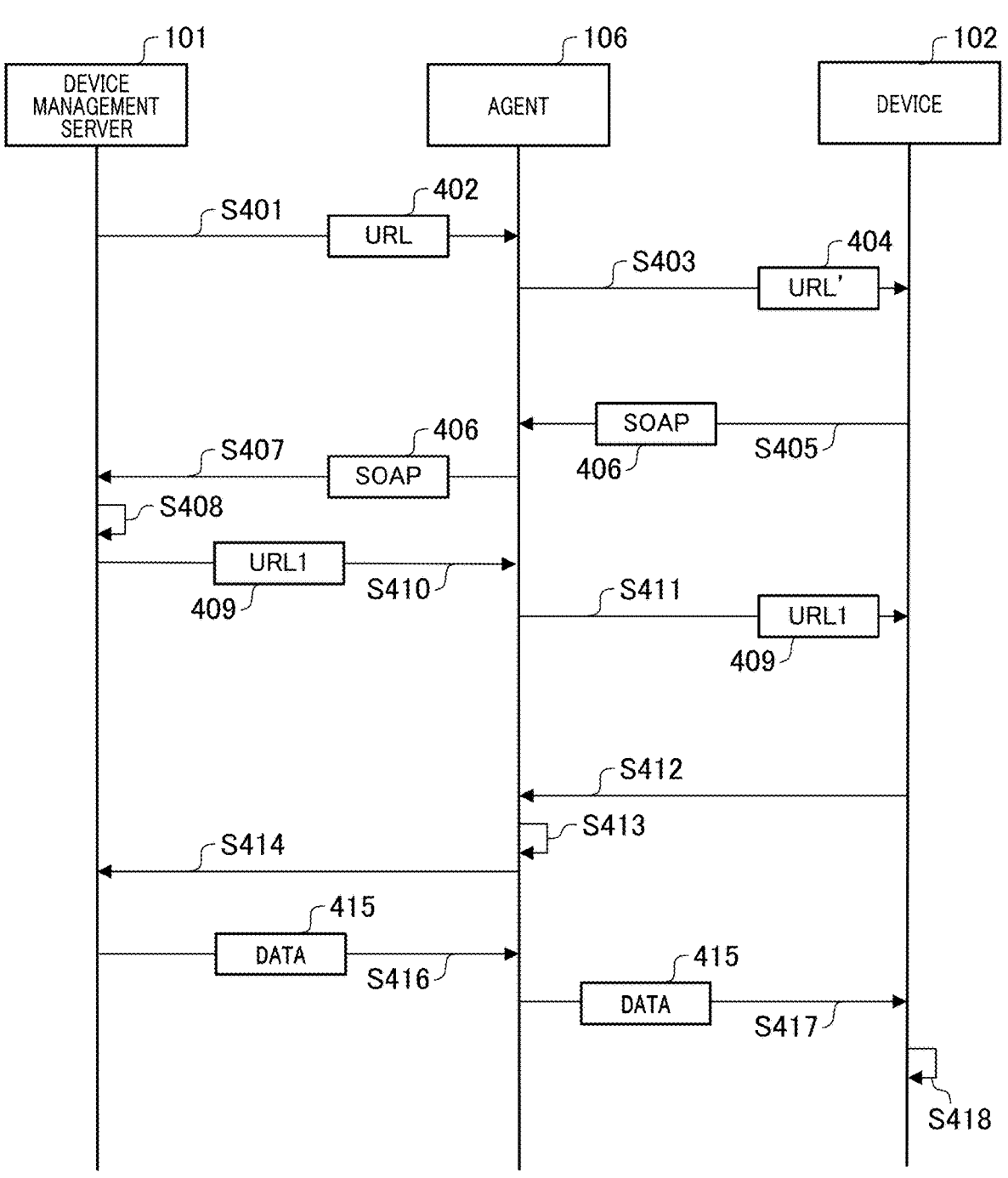
FIG. 4 is a sequence diagram showing a firmware update processing flow.

FIG. 4 is a sequence diagram showing a flow for firmware update processing. In this context, a flow is explained for the processing for a case in which the device management server 101 commands a firmware update for the device 102, which has been assigned to the agent 106. It is assumed that the agent 106 has not cached the data that is necessary to update the firmware for the device 102. In addition, the IP address for the device management server is made 192.168.10.100, and the IP address for the agent 106 is made 192.168.10.200.

During 5401, the device management server 101 transmits the firmware update command for the device 102 to the HTTP/HTTPS server 311 of the agent 106. The command includes a URL 402 for the SOAP HTTP/HTTPS server 306 (for example, "http://192.168.10.100:8080/ws/basic/") for the device to start the firmware update.

The HTTP/HTTPS server 311 inside of the agent 106 that has received the firmware update command from the device management server 101 calls the task execution unit 310 in order to execute the processing that has been commanded. During S403, the task execution unit 310 transmits a command to the device 102 to update the firmware. At this time, the task execution unit 310 replaces the URL 402 that is included in the command with a URL 404 for the HTTP/HTTPS reverse proxy 313 of the agent 106 (for example "http://192.168.10.200:8080/ws/basic/").

The device 102 that has received the firmware update command from the agent 106 transmits an HTTP/HTTPS request to the URL 404 that is included in the request during S405. That is, the device 102 transmits an HTTP/HTTPS request to the HTTP/HTTPS reverse proxy 313 of the agent 106. The HTTP/HTTPS request includes a SOAP message 406 comprising device information for the device 102, and version information for the firmware.

The HTTP/HTTPS reverse proxy 313 of the agent 106 that received the HTTP/HTTPS request from the device 102 transmits a request comprising the SOAP message 406 to the device management server 101. Specifically, the agent 106 transmits the SOAP message 406 to the URL for the SOAP HTTP/HTTPS server 306 for the device management server 101. The URL for the SOAP HTTP/HTTPS server 306 is, for example, "https://192.168.10.100:8443/ws/secure/". In this context, the request from the device 102 to the agent 106 is HTTP. However, in order to improve the confidentiality of the communications, an HTTPS protocol is used for the communications between the agent 106 and the device management application of the device management server 101.

During S408, the SOAP HTTP/HTTPS server 306 inside of the device management server 101 that has received the request from the device 102 via the agent 106 calls the firmware update processing for the firmware management unit. During the firmware update processing that is executed by the firmware management unit 305, a URL for acquiring data for updating the firmware is determined by the device 102. In this context, the details of the firmware update processing that is executed by the firmware management unit 305 of the device management server 101 will be explained using FIG. 5.

Figure 5:
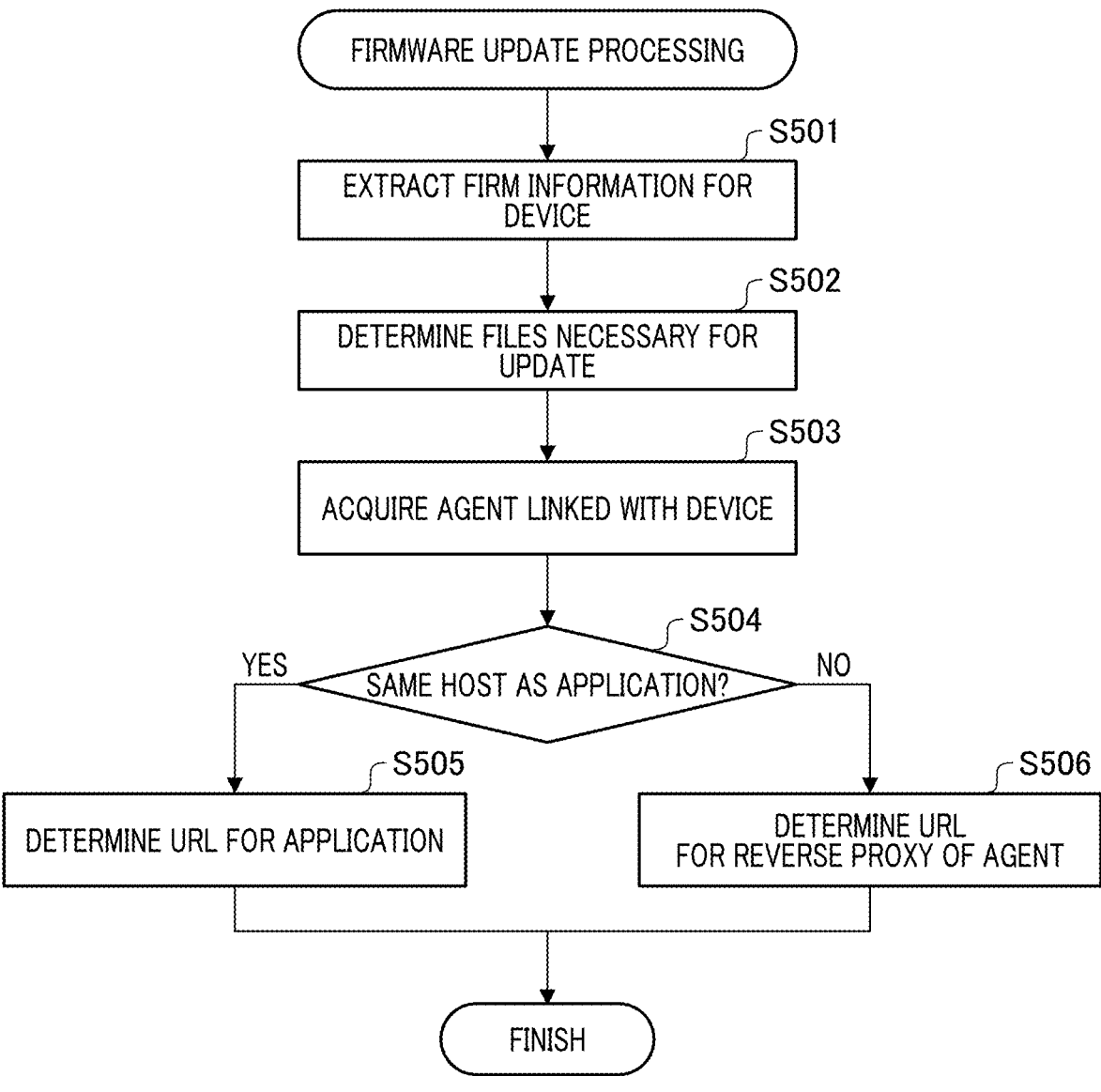
FIG. 5 is a flowchart showing a firmware update processing flow for a device management server.

FIG. 5 is flowchart showing the flow for the firmware update processing of the device management server. Each processing that is shown in FIG. 5 is realized by the CPU 201 of the device management server 101 calling and executing an application program for use in device management from a memory. During S501, the firmware management unit 305 retrieves the device information for the device 102 and version information for the firmware, which are included in the SOAP message that has been received from the device 102 via the agent 106.

During S502, the firmware management unit 305 determines a file that is necessary to update the firmware of the device 102 based on the information that has been retrieved during S501. During S503, the firmware management unit 305 acquires information for the agent 106 that has been linked to the device 102 from the device management unit 302. During S504, the firmware management unit 305 confirms whether or not the agent 106 is operating on the same host as the device management server 101. In a case in which the agent 106 is operating on the same host as the device management server 101, the processing for S505 is performed. In contrast, in a case in which the agent 106 is not operating on the same host as the device management server 101, the processing for S506 is performed.

During S505 or S506, the firmware management unit 305 indicates the URL that will be returned to the device 102. In a case in which the agent 106 and the device management server 101 are operating on the same host, during S505, the firmware management unit 305 determines a URL for acquiring a file from the URL for the HTTP/HTTPS server 304 of the device management application. The URL that is determined during S505 is, for example "https://192.168.10.100/public/firmwares/ca071592-3a64-4c88-9013-cd28a73a7901".

In a case in which the agent 106 and the device management server 101 are operating on different hosts, during S506, the firmware management unit 305 determines a URL for acquiring a file via the cache of the agent 106. That is, the firmware management unit 305 indicates a URL of the HTTP/HTTPS reverse proxy 313 of the agent 106 to serve as the URL for acquiring a file via the cache of the agent 106. The URL that is determined during S506 is, for example, "https://192.168.10.200/cache/firmwars/ca071592-3a64-4c88-9013-cd28a73a7901".

During the processing after this, the device management server 101 returns the URL that was determined during S505 or S506 to the device 102, which is the call source for the processing, via the agent 106. Due to the above-described processing, in a case in which the agent 106 and the device management server 101 are operating on the same host, the URL for an application of the device management server 101 is determined to serve as the URL that is returned to the device 102. In contrast, in a case in which the agent 106 and the device management server 101 are functioning on different hosts, the URL of the HTTP/HTTPS reverse proxy 313 of the agent 106 is determined to serve as the URL that is returned to the device 102. Therefore, in a case in which the agent 106 and the device management server are operating on the same host, when the firmware data is acquired using the URL that has been indicated during S505, the cache function of the agent 106 is not used. In contrast, in a case in which the agent 106 and the device management server 101 are operating on different hosts, when acquiring the firmware data using the URL that has been indicated during S506, the cache function of the agent 106 is used.

The explanation will now return to FIG. 4. During S410, the SOAP HTTP/HTTPS server 306 transmits a URL 409 that was determined during S408 to the agent 106 to serve as a response to the request from the HTTP/HTTPS reverse proxy 313 of the agent 106 from S407. For example, the URL that was determined during S506, "https://192.168.10.200/cache/firmwares/ca071592-3a64-4c88-9013-cd28a73a7901", is returned to serve as the URL 409. During S410, the HTTP/HTTPS reverse proxy 313 of the agent 106 that has received a response from the device management server 101 transmits the response comprising the URL 409 for use in acquiring the firmware as is to the device 102.

During S411, the device 102 that has received a response from the device management server 101 via the agent 106 transmits an HTTP/HTTPS request to the URL 409 that is included in the response from S410. This HTTP/HTTPS request is an acquisition request for the data that is necessary to update the firmware. During S413, the HTTP/HTTPS server 311 of the agent 106 that has received the acquisition request for the data that is necessary to update the firmware from the device 102 confirms if the data that has been requested exists in the cache control unit 312. In a case in which the data that has been requested exists, the HTTP/HTTPS server 311 returns the data from inside the cache to the device 102 (not shown). In contrast, in a case in which the data that has been requested does not exist, during S414, the HTTP/HTTPS server 311 transmits a request to the device management server 101 to acquire the data necessary to update the firmware, that is, the data that has been requested by the device 102.

During S416, the device management server 101 that has received the acquisition request for the data that is necessary to update the firmware from the agent 106 transmits data 415 that is necessary to update the firmware to the agent 106 to serve as a response to the request. The HTTP/HTTPS server 311 of the agent 106 that has received the data 415 from the device management server 101 saves the data 415 that has been received on the cache control unit 312, then transmits the data to the device 102. The device 102 that has received the data 415 that is necessary to update the firmware from the device management server 101 via the agent 106 uses the data 415 that is included in the response, and executes the firmware update processing on itself.

In a case in which the provision of a service from an application of the device management server 101 to the device 102, such as the firmware update processing that has been explained using FIG. 4, or the like, has not been executed normally, changes to settings by the user or the like become necessary. However, in a case in which processing is executed via the agent 106, it is difficult for the user to determine the reason that the provision of the service has not been executed normally. For example, although in a case in which the communication between the device management server 101 and the agent 106 cannot be connected, the provision of the service will not be normally executed, there are various reasons why the communication between the device management server 101 and the agent 106 cannot be connected. For example, there are cases in which on the side of the device management server 101, another software or the like is using the port for the device management server 102, and therefore, the agent 106 cannot connect to the device management server 101. In addition, there are also cases in which a customer's network environment (for example, the router 109) is blocking communication, and therefore the agent 106 cannot connect to the device management server 101.

In this context, in the present embodiment, the communication state for both the device management server 101 and the agent 106 are confirmed (diagnosed), and information that will help the user to determine the reason why the provision of the service cannot be executed normally is provided. In the present embodiment, the device management server 101 provides the user with self-diagnosis results for itself, as well as diagnosis results that have been received from the agent 106. Therefore, self-diagnosis processing is executed in the device management server 101, and diagnosis processing is also executed in the agent 106.

First, the self-diagnosis processing by the device management server 101 will be explained. During the self-diagnosis processing by the device management server 101, the device management server 101 performs self-diagnosis on a web service server that has been incorporated therein. The web service server that is the target of the diagnosis is a web service server corresponding to a function (service) that the device management server 101 provides. In the present embodiment, the HTTP/HTTPS server 304 and the SOAP HTTP/HTTPS server 306 that correspond to a firmware update service are made the targets.

The device management server 101 executes self-diagnosis for the device management server 101 according to a command from a user, and displays self-diagnosis results (first confirmation results) on a screen. The self-diagnosis results for the device management server 101 that are displayed are the self-diagnosis results for each of the HTTP server function of the HTTP/HTTPS server 304, the HTTP server function of the SOAP HTTP/HTTPS server 306, and HTTPS server function of the SOAP HTTP/HTTPS server 306.

The self-diagnosis by the device management server 101 is started by the detection of a user command for self-diagnosis on the state display screen of the device management server 101. FIG. 6 is a flowchart showing self-diagnosis processing by the device management server. Each processing that is shown in FIG. 6 is realized by the CPU 201 of the device management server 101 calling and executing an application program for use in device management from a memory.

During S601, the self-diagnosis unit 307 acquires the address for the device management server 101. The address is indicated by the user when the device management server 101 is installed, and is stored in the settings file and database of the device management server 101. This address is an address for the host apparatus of the device management server 101. During S602, the self-diagnosis unit 307 tests communications by transmitting a request to the HTTP/HTTPS server 304 of the device management server 101, and then transits the results thereof. Specifically, the self-diagnosis unit 307 sets the address that was acquired during S601 as the host address for the URI for use in HTTP file acquisition for the HTTP/HTTPS server 304, transmits a request, and receives the results of a response corresponding to the request. During S603, the self-diagnosis unit 307 confirms if the results that were received during S602 were the results that were expected, and stores the confirmation results on the memory. For example, in a case in which the results that were received during S602 were the results that were expected, the self-diagnosis unit 307 makes the results "OK", and in the case in which the results that were received during S602 were not the results that were expected, makes the results "error". During S602 and S603, the self-diagnosis unit 307 tests communications by transmitting a request to the HTTP/HTTPS server 304, confirms the result thereof, and stores the confirmation results.

During S604, the self-diagnosis unit 307 transmits a request to the SOAP HTTP/HTTPS server 306 in order to confirm the HTTP server function of the SOAP HTTP/HTTPS server 306 of the device management server 101, and receives the results thereof. Specifically, the self-diagnosis unit 307 sets the address that was acquired during S601 as the host address for the URI for use in confirming HTTP operations of the SOAP HTTP/HTTPS server 306, transmits a request thereto, and receives the results of a response corresponding to the request. During S605, the self-diagnosis unit 307 confirms if the results that have been received are the results that were expected, and stores the confirmation results on the memory. During S604 and S605, the self-diagnosis unit 307 tests communications by transmitting a request to the HTTP server function of the SOAP HTTP/HTTPS server 306, confirms the response thereto, and stores the confirmation results.

During S606, the self-diagnosis unit 307 transmits a request to the SOAP HTTP/HTTPS server 306 in order to confirm the HTTPS server function of the SOAP HTTP/HTTPS server 306 of the device management server 101, and receives the results thereof. Specifically, the self-diagnosis unit 307 sets the address that was acquired during S601 as the host address for the URI for use in confirming the HTTPS operations of the SOAP HTTP/HTTPS server 306, transmits a request thereto, and receives results of a response to the request. During S607, the self-diagnosis unit 307 confirms if the results that were received during S606 are the results that were expected, and stores the confirmation results on the memory. During S606 and S607, the self-diagnosis unit 307 tests communications by transmitting a request to the HTTPS server function of the SOAP HTTP/HTTPS server 306, confirms the response thereto, and stores the confirmation results.

During S608, the self-diagnosis unit 307 provides the diagnosis results for the HTTP function of the HTTP/HTTPS server 304, the HTTP function of the SOAP HTTP//HTTPS server 306, and the HTTPS function of the SOAP HTTP/HTTPS server 306. That is, the self-diagnosis unit 307 provides the confirmation results (first confirmation results) from S603, S605, and S607 to serve as the diagnosis results. The self-diagnosis unit 307 may also be made to provide the diagnosis results to the VC 205 and thereby display them on a display device, or it may also be made to provide the diagnosis results to the NIC 208 and thereby display them using a Web browser.

Cases in which the results are not the results of the request that the self-diagnosis unit 307 was expecting, and in which the self-diagnosis unit 307 makes the diagnosis results an error are, for example, cases such as those below:

A case in which the system or another application on the host that the device management server 101 operates on is using the TCP port that the HTTP/HTTPS server 304 and the SOAP HTTP/HTTPS server 306 are waiting for reception from, and therefore, a request cannot be received.

Cases in which the address that was indicated when the device management server 101 was installed is incorrect.

Figure 7:
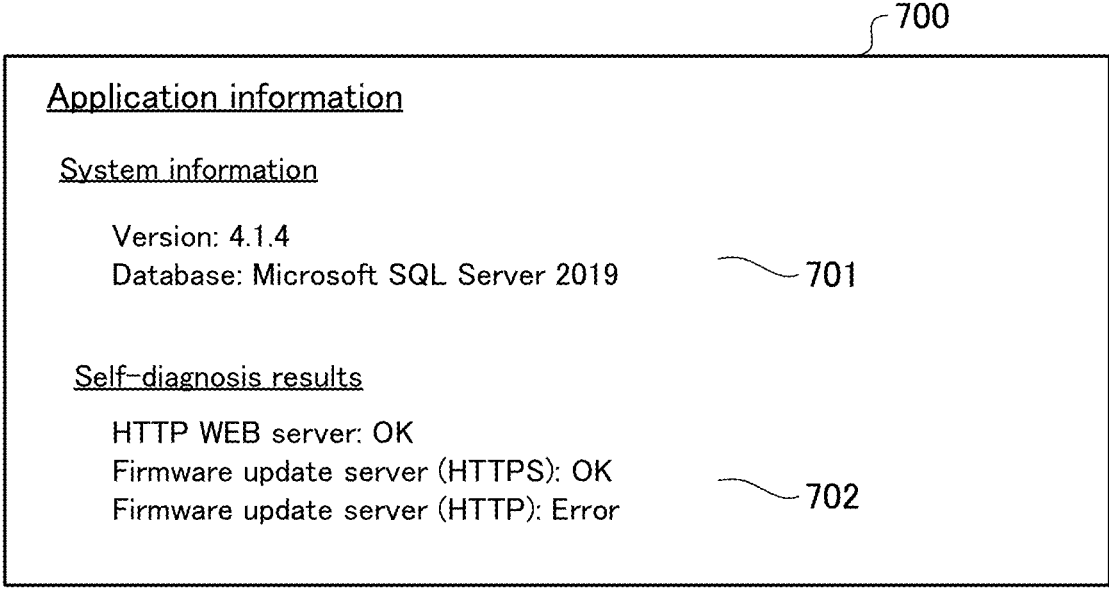
FIG. 7 is a diagram showing one example of a diagnosis results screen for a device management server.

FIG. 7 is a diagram showing one example of a diagnosis results screen for the device management server. A diagnosis results screen 700 of the device management server 101 is a screen that is displayed based on the diagnosis results (confirmation results) that were provided by the self-diagnosis unit 307 during S608. The diagnosis results screen 700 includes system information 701 and diagnosis results 702. The system information 701 displays information for the device management server 101. For example, version information for the device management server 101 and information relating to databases that are being used are included in the system information 701. The diagnosis results 702 display the results of confirming the responses for testing communications with each web service server that has been operated by the device management server 101 to serve as the self-diagnosis results for the device management server 101. In the example of the diagnosis results 702 that are shown in FIG. 7, the "HTTP WEB server" and the "firmware update server (HTTP) are "OK", which shows that they are normal, and the "firmware update server (HTTP) is "error", which shows the state that was described above. This shows that during S603 and S607, the self-diagnosis unit 307 was able to confirm the results that were expected, and that during S605, the self-diagnosis unit 307 was not able to confirm the results that were expected. By confirming the diagnosis results screen 700, the user is able to grasp that there is a high possibility that the reason why the service that is provided by the device management server 101 cannot be normally performed is due to the HTTP function of the SOAP HTTP/HTTPS server 306.

Next, the diagnosis processing by the agent 106 will be explained. During the diagnosis processing by the agent 106, the agent 106 performs self-diagnosis on a web service server relating to a service that is provided by the device management server 101 that has been incorporated into that the device management server 101. In the present embodiment, the HTTP/HTTPS server 311 and the HTTP/HTTPS reverse proxy 313 corresponding to the firmware update service provided by the device management server 101 are made the targets of the diagnosis.

Furthermore, during the diagnosis processing by the agent 106, the agent 106 also performs diagnosis with respect to the communications with a web service server relating to a service provided by the device management server 101 that has been incorporated into the device management server 101. The web service server relating to the service that is provided by the device management server 101 that has been incorporated into the device management server 101 is the SOAP HTTP/HTTPS server 306. The agent 106 may periodically execute diagnosis processing, or it may also execute diagnosis processing in response to a command from the device management server 101.

Figure 8:
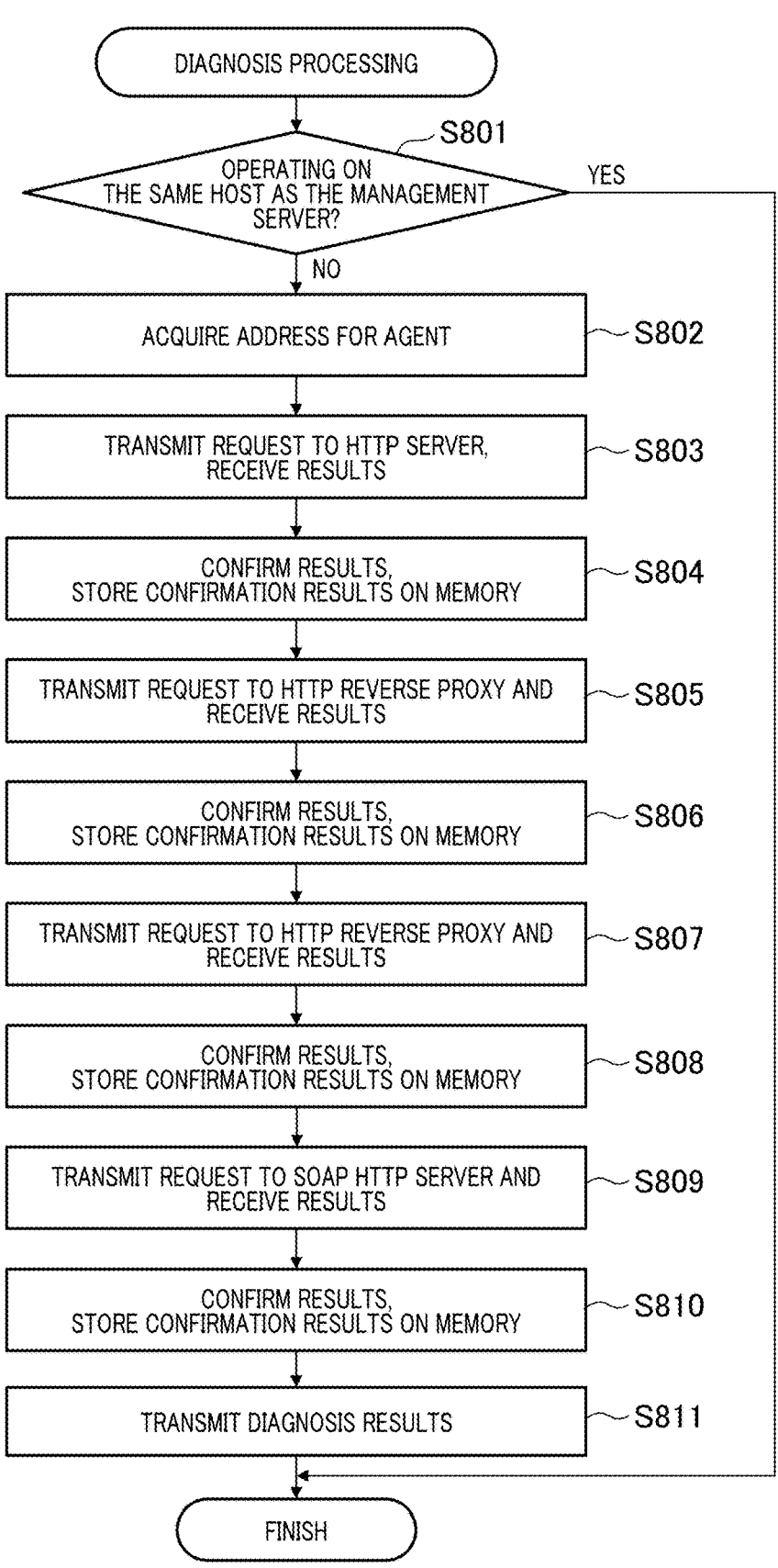
FIG. 8 is a flowchart showing diagnosis processing by an agent.

FIG. 8 is a flowchart showing diagnosis processing by an agent. Each processing that is shown in FIG. 8 is realized by the CPU of the agent 106 calling an application program for use in an agent related to a service that is provided by the device management server 101 from a memory, and executing this. In the present embodiment, an example is explained for a case in which the agent 106 periodically performs diagnosis processing, and provides the results of the diagnosis processing (second confirmation results) to the device management server 101.

During S801, the self-diagnosis unit 314 confirms if the device management server 101 is operating on the same host apparatus. In a case in which the device management server 101 is operating on the same host apparatus, the processing is completed. In contrast, in a case in which the device management server 101 is operating on a different host, the processing for S802 is performed. During S802, the self-diagnosis unit 314 acquires the address for the agent 106 on which it operates. This address is the address for the host apparatus of the agent 106.

During S803, the self-diagnosis unit 314 transmits a request to the HTTP/HTTPS server 311 of the agent 106, and receives the results thereof. Specifically, the self-diagnosis unit 314 sets the address that was acquired during S802 as the host address for the URI for use in HTTP file acquisition for the HTTP/HTTPS server 311, transmits a request thereto, and receives results for a response corresponding to the request. During S804, the self-diagnosis unit 314 confirms if the results that were received during S803 were the results that were expected, and stores the confirmation results on the memory. During S803 and S804, the self-diagnosis unit 314 tests communications by transmitting a request to the HTTP/HTTPS server 311, confirms the response thereto, and stores the confirmation results.

During S805, the self-diagnosis unit 314 transmits a request to the HTTP/HTTPS server 311 of the agent 106 in order to confirm the HTTP function of the HTTP/HTTPS reverse proxy 313, and receives the results thereof. Specifically, the self-diagnosis unit 314 sets the address that was acquired during S802 as the host address for the URI that is dedicated for use in HTTP operation confirmation for the HTTP/HTTPS reverse proxy 313, transmits a request thereto, and receives results of a response to the request. During S806, the self-diagnosis unit 314 confirms if the results that were received during S805 were the results that were expected, and stores the confirmation results on a memory. During S805, and S806, the self-diagnosis unit 314 tests communications by transmitting a request to the HTTP function of the HTTP/HTTPS reverse proxy 313, confirms the response thereto, and stores the confirmation results.

In this context, the URI for use in the self-diagnosis of the HTTP/HTTPS reverse proxy 313 during S805 will be explained. There are two configurations that can serve as the configuration of the URI. As the first configuration, for example, a pass for the URI for use in a service of the SOAP HTTP/HTTPS server 306 is configured so as to necessarily begin with "/ws/". In a case in which the pass for the URI for a request that has been received begins with "/ws/", the HTTP/HTTPS reverse proxy 313 transfers the request to the SOAP HTTP/HTTPS server 306 of the device management server 101, receives the results thereof, and then returns these. A user who has received these results will have to determine if the HTTP/HTTPS reverse proxy 313 is operating correctly by combining these results with the self-diagnosis results for the SOAP HTTP/HTTPS server 306 of the device management server 101.

In addition, as the second configuration, for example, the pass for the URI for use with the SOAP HTTP/HTTPS server 306 is configured as "/diag". In this case, the HTTP/HTTPS reverse proxy 313 creates a response within the reverse proxy without transferring the request, and returns this. That is, the HTTP/HTTPS reverse proxy 313 is provided with the URI dedicated for use in self-diagnosis, and it returns a response according to necessity without transferring the request that was received to the SOAP HTTP/HTTPS server 306 of the device management server 101. These response results are the self-diagnosis results for the HTTP/HTTPS reverse proxy 313, and show if the HTTP/HTTPS reverse proxy 313 is operating correctly. In the present embodiment, as one example, a URI of the second configuration, in which the pass for the URI for use in a service of the SOAP HTTP/HTTPS server is configured as "/daig", for which a transfer to the device management server 101 is not performed, is used as the URI for use in confirming operations. Note that the setting method for the URI for use in the self-diagnosis of the HTTP/HTTPS reverse proxy 313 is also the same in S807, which will be explained below.

During S807, the self-diagnosis unit 314 transmits a request to the HTTP/HTTPS reverse proxy 313 in order to confirm the HTTPS function of the HTTP/HTTPS reverse proxy 313 of the agent 106, and receives the results thereof. Specifically, the self-diagnosis unit 314 sets the address that was received during S802 as the host address for the URI for use in confirming the HTTPS operations of the HTTP/HTTPS reverse proxy 313, transmits a request thereto, and receives response results for this request. During S808, the self-diagnosis unit 314 confirms if the results that were received during S807 were the results that were expected, and stores the confirmation results on a memory. During S807, and S808, the self-diagnosis unit 314 tests communications by transmitting a request to the HTTPS function of the HTTP/HTTPS reverse proxy 313, confirms the response thereto, and stores the confirmation results.

During S809, the self-diagnosis unit 314 transmits a request to the SOAP HTTP/HTTPS server 306 of the device management server 101, and receives the results thereof. Specifically, the self-diagnosis unit 314 transmits a request to the URI for use in confirming HTTPS operations to the SOAP HTTP/HTTPS server 306, and receives results for a response to the request. During S810, the self-diagnosis unit 314 confirms if the results that were received during S809 were the results that were expected, and stores the confirmation results on a memory. During S807 and S808, the self-diagnosis unit 314 tests communications by transmitting a request to the SOAP HTTP/HTTPS server 306 of the device management server 101, confirms the response thereto, and stores the confirmation results. Note that diagnosis is not performed with respect to the normal communication path for the agent 106 and the device management server 101. This is because, in a case in which the normal communication path between the agent 106 and the device management server 101 has been interrupted, the display of the UI and the provision of the diagnosis results could not be performed in the first place. Therefore, in the present embodiment, confirmation is only performed for the connection with web service server functions relating to the firmware update.

During S811, the self-diagnosis unit 314 transmits the confirmation results from the diagnosis processing (the second confirmation results) to the device management server 101. Specifically, the self-diagnosis unit 314 transmits the confirmation results that were stored during S804, S806, S808, and S810 to the URI for use in the reception of diagnosis results for the HTTPS of the HTTP/HTTPS server 304 of the device management server 101. The HTTP/HTTPS server 304 of the device management server 101 stores the diagnosis results for the agent 106 that have been received on a database to serve as one portion of the agent information that is managed by the agent management unit 301. In addition, the device management server 101 provides the diagnosis results for the agent 106 using a web browser or the like according to a command from the user.

Cases in which the results for the request from the self-diagnosis unit 314 of the agent 106 are not the results that were expected, and in which the self-diagnosis unit 314 makes the diagnosis results an error are, for example, cases such as those below:

A case in which the system or another application on the host on which the agent 106 operates is using the TCP port that the HTTP/HTTPS server 311 and the HTTP/HTTPS reverse proxy 313 are waiting for reception from, and therefore, a request cannot be received. In this case, any of S804, S806, and S808 will become an error.

Cases in which a connection cannot be made to the HTTPS function of the SOAP HTTP/HTTPS server 306 of the device management server 101. In such cases, S810 will become an error.

Note that in a case in which S810 is an error, in cases in which the self-diagnosis unit 307 for the device management server 101 diagnoses that the HTTPS function of the SOAP HTTP/HTTPS server 306 is functioning, it can be specified that there is a problem in the connection path. This connection path is the connection path from the agent 106 to the HTTPS function of the SOAP HTTP/HTTPS server 306 of the device management server 101.

FIG. 9 is a diagram showing one example of an agent management screen. A list of the agents that are managed by the device management server 101 (an agent list 901) is displayed on an agent management screen 900. The agent management screen 900 includes the agent list 901 and a create new agent button 902. The information that is displayed on the agent list 901 is managed by the agent management unit 301.

The agent list 901 includes, for example, the name of an agent, the state of an agent, the date and time at which communications were last received from an agent, the number of devices that are assigned to an agent, and a button for deleting an agent. Upon detecting that the name of an agent has been clicked, the device management server 101 transitions to an editing screen (not shown) for each agent. Upon detecting that the create new agent button 902 has been pressed down, the device management server 101 transitions to a new agent creation screen (not shown).

The state of an agent is displayed in the state column. The results of the diagnosis processing by the agent are used in the display of the state. In a case in which the results of the diagnosis processing have been received from the agent within a predetermined period, the device management server 101 displays these results in the state column of the agent list 901, and in a case in which the results of the diagnosis processing have not been received from the agent within the predetermined period, "no response" is displayed. In a case in which all of the self-diagnosis results for the agent are normal, the device management server 101 displays "normal" in the state column of the agent list 901. In contrast, in a case in which the diagnosis results for the agent are an error, as is shown in an error state 903, "self-diagnosis error" is displayed in the state column of the agent list 901.

Upon detecting the movement of the mouse pointer to the error state 903 or the pressing down of the error state 903, the device management server 101 displays an overlay of detailed information 904 from the self-diagnosis. The detailed information 904 displays, for example, the items from the diagnosis results that were an error. Note that it may also be made such that all of the diagnosis results including normal diagnosis results are displayed in the detailed information 904. In the example that is shown in FIG. 9, the detailed information 904 displays that an error has occurred for the HTTP function and the HTTPS function for the HTTP/HTTPS reverse proxy 313 as the error for the server according to the firmware update.

In the present embodiment, an example has been explained in which the results of the self-diagnosis processing for the device management server 101 and the results of the diagnosis processing for the agent 106 are displayed separately. However, it may also be made such that the results for both are provided together by displaying them on one screen, or the like. In addition, the timeout value for the connection when testing the communications by transmitting a request may also be set so as to be shorter than the default timeout value. It is thereby possible to detect a malfunctioning state more quickly, and then provide this to the user.

It is possible to hide the firmware update function from the user in the device management server by using settings. In this case, the concealment of the functions is performed by making it such that the UI elements relating to the firmware update function are not displayed on the screen. By just not displaying the UI function on the screen, the function is still active, and therefore, the firmware management unit 305, the SOAP HTTP/HTTPS server 306, and the HTTP/HTTPS reverse proxy 313 are still operating. In a case in which the firmware update function is hidden from the user, although it is possible to detect the active/inactive settings for the firmware update function from the device management server 101, it is made such that it is not possible to detect this from the agent 106. In this case, upon detecting that the firmware update function is inactive, the self-diagnosis unit 307 of the device management server 101 does not implement the self-diagnosis function for the SOAP HTTP/HTTPS server 306. In addition, the HTTP/HTTPS server 304 of the device management server 101 that has received the diagnosis results from the agent 106 discards a portion of the diagnosis results from the diagnosis results that have been received from the agent 106. Specifically, the HTTP/HTTPS server 304 discards the diagnosis results for the HTTP/HTTPS reverse proxy 313 and the SOAP HTTP/HTTPS server 304 of the device management server 101 that are included in the self-diagnosis results that have been received. Due to this, when the self-diagnosis results are being displayed, the device management server 101 does not display the self-diagnosis results relating to the firmware update function.

As has been explained above, according to the present embodiment, it is possible to test communications with a web service server that has been incorporated into the device management server 101, and with a web service server that has been incorporated into the agent 106, confirm the results thereof, and provide the confirmation results to a user from the device management server 101. It is thereby possible to provide information for specifying the reason for a problem that occurs when providing a service to a network device via an agent. It becomes easier for the user to identify the reason for this problem by using the information that has been provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-116675, filed Jul. 18, 2023, which is hereby incorporated by reference herein in its entirety.

What is claimed is:

1. A device management server configured to perform communications with a network device that is a management target via an agent device, the device management server comprising:
   a memory storing instructions; and
   a processor executing the instructions causing the device management server to:
      store first confirmation results indicating that first communications with a first web service server incorporated into the device management server, the first web service server corresponding to a service provided by the device management server, have been tested and that a first response to the first communications has been confirmed;
      receive and store, from the agent device, second confirmation results indicating that second communications with a second web service server incorporated into the agent device, the second web service server relating to the service provided by the device management server, have been tested and a second response to the second communications has been confirmed;
      provide the first confirmation results; and
      provide the second confirmation results.

2. The device management server according to claim 1, wherein the second web service server incorporated into the agent device includes a reverse proxy.

3. The device management server according to claim 2, wherein a service provided by the device management server that uses the reverse proxy includes a service for updating firmware of the network device that is the management target via the agent device.

4. The device management server according to claim 2, wherein the second confirmation results further include results in which a third response from the first web service server has been confirmed from when the agent device has tested third communications with the first web service server incorporated into the device management server and the first web service server receiving a request from the agent device via the reverse proxy.

5. The device management server according to claim 4, wherein the reverse proxy has a dedicated URI for testing the third communications, and in a case in which the request has been received for the dedicated URI from the agent device, the reverse proxy returns a fourth response to the agent device without transferring the request to the first web service server incorporated into the device management server.

6. The device management server according to claim 1, wherein during testing communications relating to the first web service incorporated into the device management server and the second web service server incorporated into the agent device, a timeout value for connection is set so as to be shorter than a default timeout value.

7. The device management server according to claim 1, wherein the device management server and the network device do not directly communicate.

8. The device management server according to claim 1, wherein the agent device transfers the service provided by the device management server to the network device.

9. A control method for a device management server configured to perform communications with a network device that is a management target via an agent device, the method comprising:
   testing first communications with a first web service server incorporated into the device management server, the first web service server corresponding to a service provided by the device management server, confirming a first response to the first communications, and storing first confirmation results;
   receiving and storing, from the agent device, second confirmation results indicating that second communications with a second web service server incorporated into the agent device, the second web service server relating to the service provided by the device management server, have been tested and a second response to the second communications has been confirmed;
   providing the first confirmation results; and
   providing the second confirmation results.

10. A non-transitory storage medium storing a control program of a device management server configured to perform communications with a network device that is a management target via an agent device, the control program causing a computer to perform each step of a control method of the device management server, the method comprising:
   testing first communications with a first web service server incorporated into the device management server, the first web service server corresponding to a service provided by the device management server, confirming a first response to the first communications, and storing first confirmation results;
   receiving and storing, from the agent device, second confirmation results indicating that second communications with a second web service server incorporated into the agent device, the second web service server relating to the service provided by the device management server, have been tested and a second response to the second communications has been confirmed;
   providing the first confirmation results; and
   providing the second confirmation results.

* * * * *